UNITED STATES PATENT OFFICE.

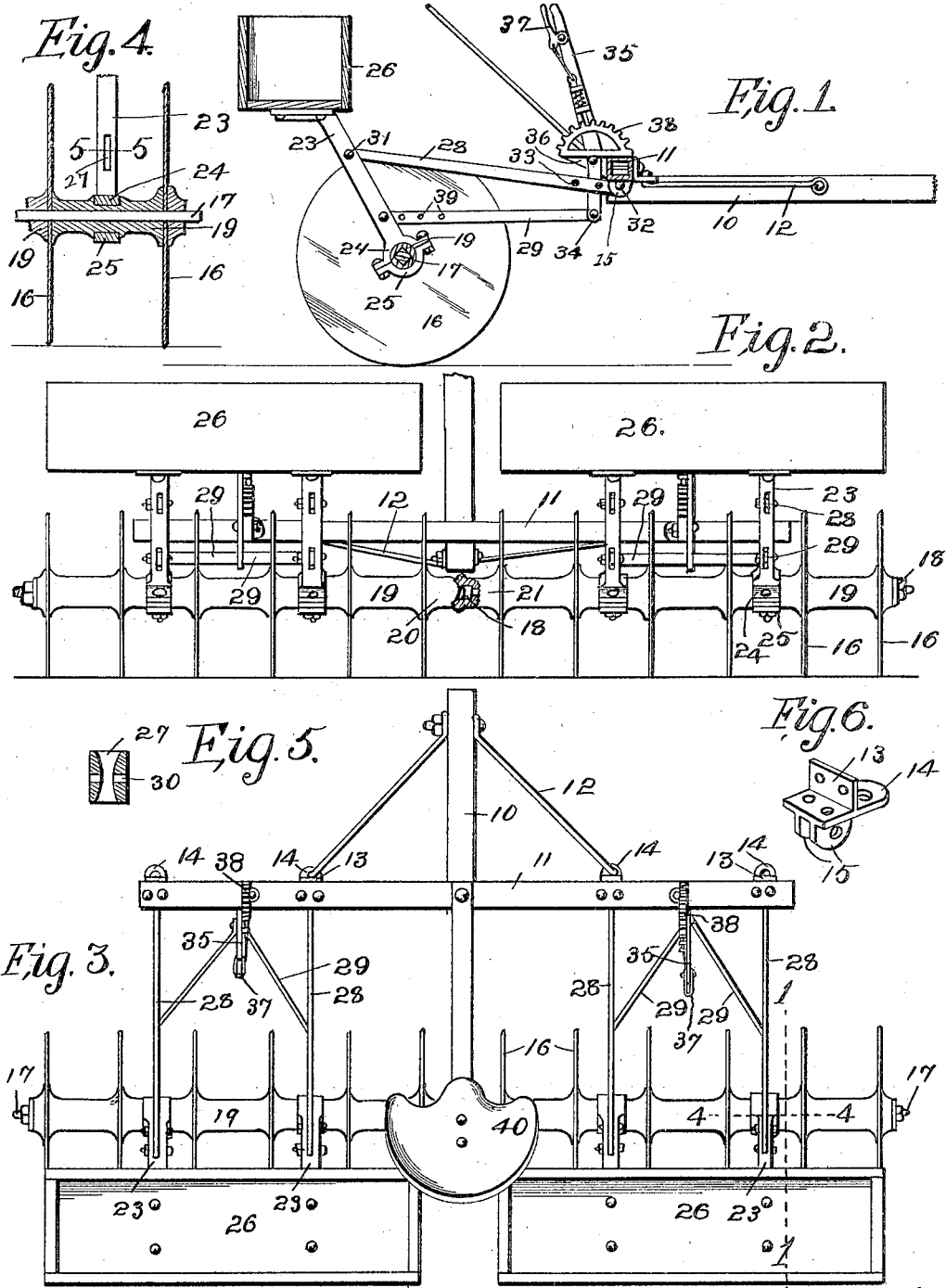

PEARL C. MEREDITH AND THOMAS O. MEREDITH, OF MARNE, IOWA.

SOD AND CORNSTALK CUTTER.

No. 818,105.          Specification of Letters Patent.          Patented April 17, 1906.

Application filed June 24, 1905. Serial No. 266,875.

*To all whom it may concern:*

Be it known that we, PEARL C. MEREDITH and THOMAS O. MEREDITH, citizens of the United States, residing at Marne, in the county of Cass and State of Iowa, have invented a certain new and useful Sod and Cornstalk Cutter, of which the following is a specification.

The object of our invention is to provide a machine of this class of simple, durable, and inexpensive construction designed to be advanced over a field by draft-animals preparatory to plowing a field for the purpose of cutting sod or stalks upon the field, so that they may be turned under more readily and the ground be left in better condition after being plowed.

A further object is to provide a machine of this class in which the cutting-disks may be quickly and easily adjusted to cut into the ground to a greater or less depth.

Our invention consists in the construction, arrangement, and combination of the various parts of the device whereby the objects contemplated are attained, as hereinafter more fully set forth, pointed out in our claims, and illustrated in the accompanying drawings, in which—

Figure 1 shows a longitudinal sectional view on the line 1 1 of Fig. 3 of a machine embodying our invention. Fig. 2 shows a rear end elevation of same. Fig. 3 shows a top or plan view of same. Fig. 4 shows a detail sectional view on the line 4 4 of Fig. 3. Fig. 5 shows a sectional view on the line 5 5 of Fig. 4, and Fig. 6 shows a detail perspective view of one of the brackets to be attached to the cross-piece for connecting the forward ends of the weight-supporting links therewith.

Referring to the accompanying drawings, we have used the reference-numeral 10 to indicate the machine-tongue. Fixed to the rear end of the tongue is a cross-piece 11, rigidly supported at right angles to the tongue by the brace-rods 12. Mounted upon this cross-piece 11 is a number of brackets 13, secured to the under and forward surfaces thereof. At the front of each bracket is a perforated lug 14, two of which are utilized for connecting the rods 12 therewith, and on the under surface of each bracket are two lugs 15, spaced apart and perforated, for purposes hereinafter made clear.

The cutters proper comprise a number of flat disks 16 with sharpened edges and provided with angular openings at their centers. These disks are arranged in two sections, each section provided with an angular rod 17, passed through the disks and provided with nuts 18 at their ends. The disks are held spaced apart on said rods by means of the sleeves 19, which are provided with angular openings to receive the rod 17. Some of these sleeves are provided with annular grooves at their central portions, for purposes hereinafter made clear. At the meeting ends of said sections thus formed a rounded projection 20 is placed upon the rod 17, and the adjacent portion of the other section is provided with a member 21, formed with a socket to receive the part 20, thus providing for a universal movement between said sections and yet holding the adjacent disks thereof accurately spaced apart. On each of the sections thus formed we have mounted two weight-supporting arms, each comprising a body portion 23 with a boxing member 24 formed at its lower end to mate with a coacting boxing member 25. These members lie in the annular grooves of the hubs 19, that are provided with grooves, as before explained. Fixed to the upper ends of each pair of these arms is a weight-receiving box 26, and in the body portion 23 of each of said arms are slots 27, with convexed inner faces to receive the links 28 and 29. These arms 23 are also provided with transverse openings 30 to receive the bolts 31, by which said links are pivotally connected with the arms. The convexed inner surfaces of the slots 27 provide means by which the said arms may turn slightly relative to said links.

The upper links 28 of each section have their forward ends inserted between the lugs 15, with which they are pivotally connected by the bolts 32, and said links are provided with openings 33, so that they may be adjusted relative to the cross-piece. In the lower slots 27 are the links 29, which extend forwardly, and the forward ends of each pair extend inwardly toward each other and are jointly pivoted by means of the bolt 34 to the lower ends of a lever 35, which lever is fulcrumed to a bracket 36, fixed to the cross-piece 11, and is provided with a spring-actuated pawl 37, which pawl is normally held in engagement with a sector 38, also fixed to said cross-piece. The said links 29 are provided with openings at 39, by which they may be adjusted relative to the uprights 23.

The numeral 40 indicates a seat fixed to the cross-piece 11.

In practical operation, and assuming that it is desired to cut sod, the boxes 26 are provided with weights and the machine is then advanced across a field along lines at right angles to the direction in which it is intended to plow the field. The disks will cut the sod into narrow strips, so that when the field is plowed the sod will be inverted readily and will not be likely to stand on edge, as it will be cut up into small rectangular pieces. If the levers 35 are moved forwardly, the links 29 will be moved rearwardly and will thus throw the disks directly under the weighted boxes 26 and will throw more of the weight upon the tongue. Hence the disks will not cut into the ground-surface very deep. If, on the other hand, the levers 35 are moved rearwardly, then the disks will be moved forwardly relative to the weighted boxes, and the weight of the boxes will tend to relieve the weight from the tongue and cause the disks to cut deeper into the ground. The implement is also of considerable value in cutting stalks that are lying upon the ground-surface, so that said stalks may be plowed under more readily.

Having thus described our invention, what we claim, and desire to secure by Letters Patent of the United States, therefore, is—

1. In an implement of the kind described, the combination of a tongue, a cross-piece fixed to the tongue, a series of flat disks arranged in line, arms connected with the disk-supports and extended upwardly, a weight attached to the upper ends thereof, links connected to the cross-piece and to the arms, links at the lower ends of the arms and an adjustable lever connected to said lower links to tilt the weight forwardly and rearwardly relative to the disks.

2. In an implement of the kind described, the combination of a tongue, a cross-piece fixed to the tongue, a series of flat disks arranged in line, arms connected with the disk-supports and extended upwardly, a weight attached to the upper ends thereof, adjustable links connected to the cross-piece and to the top of the arms, adjustable links at the lower ends of the arms and a lever fulcrumed to the weight and connected to the lower links.

3. In an implement of the kind described, the combination of a tongue, a cross-piece, a number of brackets connected to the cross-piece, two levers fulcrumed to the end portions of the cross-piece, two sectors adjacent to said levers and fixed to the cross-piece, spring-actuated pawls carried by the levers to engage the sectors, two angular rods, a series of flat sharpened disks on each, sleeves on the rods between the disks, the inner ends of the meeting portions of said sleeves on said rods connected by a universal joint, two arms for each set of disks, said arms formed with detachable boxings at their lower ends rotatably mounted upon the sleeves of said set of disks, two upper links adjustable longitudinally pivotally connected to the upper ends of said arms and to the brackets on the cross-piece, two lower adjustable sets of links pivotally connected to the arms and also pivotally connected to said lever and a weight attached to the upper end of each pair of said arms.

Des Moines, Iowa, May 23, 1905.

PEARL C. MEREDITH.
THOMAS O. MEREDITH.

Witnesses:
T. W. WINTERS,
M. G. ANDERSON.